US008834765B2

(12) United States Patent
Esaki et al.

(10) Patent No.: US 8,834,765 B2
(45) Date of Patent: Sep. 16, 2014

(54) METHOD OF MANUFACTURE FOR ENCASED COIL BODY

(75) Inventors: Junichi Esaki, Nagoya (JP); Hiroyuki Kato, Nakatsugawa (JP); Yasuhiro Matsumoto, Nakatsugawa (JP)

(73) Assignee: Daido Steel Co., Ltd., Nagoya-Shi, Aichi (JP)

( * ) Notice: Subject to any disclaimer, the term of this patent is extended or adjusted under 35 U.S.C. 154(b) by 0 days.

(21) Appl. No.: 13/636,101

(22) PCT Filed: Mar. 17, 2011

(86) PCT No.: PCT/JP2011/056474
§ 371 (c)(1), (2), (4) Date: Sep. 19, 2012

(87) PCT Pub. No.: WO2011/118508
PCT Pub. Date: Sep. 29, 2011

(65) Prior Publication Data
US 2013/0002383 A1 Jan. 3, 2013

(30) Foreign Application Priority Data
Mar. 20, 2010 (JP) ................................ 2010-065308

(51) Int. Cl.
*B29C 45/14* (2006.01)

(52) U.S. Cl.
USPC ....... 264/254; 264/238; 264/255; 264/272.19

(58) Field of Classification Search
None
See application file for complete search history.

(56) References Cited

U.S. PATENT DOCUMENTS 1,796,421 A * 3/1931 Apple ............................. 336/96
2,743,308 A * 4/1956 Bardsley ...................... 174/559

(Continued)

FOREIGN PATENT DOCUMENTS

JP 03119711 * 9/1989
JP 2001-267136 A 9/2001

(Continued)

OTHER PUBLICATIONS

Japanese Notification of Reasons for Refusal dated Dec. 10, 2013, with English translation.

*Primary Examiner* — Edmund H. Lee
(74) *Attorney, Agent, or Firm* — McGinn IP Law Group, PLLC

(57) ABSTRACT

[Problem] To provide a method of manufacture for an encased coil body, which is capable of easily manufacturing an encased coil body which is configured so as to be encased in a state where a coil is enclosed within an electrically insulating resin and is also capable of favorably preventing the coil from positional misalignment or deformation at the time of the manufacture.

[Means for Solution] The method includes injection-molding a resin covering layer which encases the coil 10 with a thermoplastic resin, in which the injection-molding is carried out such that the injection-molding step is divided into a primary molding step and a secondary molding step, in which the primary molding step includes contacting a primary molding die to an inner circumferential surface of the coil 10 and molding a primary molded body 22-1 which includes an outer circumferential covering portion 46 in a state where the coil 10 is constrained so as to be positioned in a radial direction, and the secondary molding step includes, after the primary molding step, setting the primary molded body 22-1 along with the coil 10 to a secondary molding die and molding a secondary molded body which includes an inner circumferential covering portion.

10 Claims, 10 Drawing Sheets

(56) References Cited

U.S. PATENT DOCUMENTS

| | | | | |
|---|---|---|---|---|
| 3,201,729 | A * | 8/1965 | Blanchi et al. | 336/83 |
| 3,742,411 | A * | 6/1973 | Hill | 336/96 |
| 5,128,292 | A * | 7/1992 | Lomas | 502/41 |
| 6,248,279 | B1 * | 6/2001 | Walsh | 264/254 |
| 6,790,398 | B1 * | 9/2004 | Ejima et al. | 264/251 |
| 7,695,665 | B2 * | 4/2010 | Zadesky et al. | 264/328.8 |
| 2001/0030595 | A1 | 10/2001 | Hamatani et al. | |
| 2007/0256759 | A1 * | 11/2007 | Matsukawa et al. | 148/101 |

FOREIGN PATENT DOCUMENTS

| | | | |
|---|---|---|---|
| JP | 2003-282333 | A | 10/2003 |
| JP | 2004-039888 | A | 2/2004 |
| JP | 2006-004957 | A | 1/2006 |
| JP | 2007-027185 | A | 2/2007 |
| JP | 2008-147405 | A | 6/2008 |
| JP | 2008-210463 | A | 9/2008 |
| JP | 2010-214590 | A | 9/2010 |

* cited by examiner (A)

(B)

(C)

(a)

(b)

(c)

(A)

(B)

METHOD OF MANUFACTURE FOR ENCASED COIL BODY

TECHNICAL FIELD

The present invention relates to a method of manufacture for an encased coil body which is configured so as to be encased in a state where an electric coil is entirely enclosed with an electrically insulating resin from the outside, and is to be provided in a state of being embedded in an inner portion of a core containing a soft magnetic powder to constitute a coil composite molded body along with the core; and the encased coil body.

BACKGROUND ART

As a representative example of this kind of coil composite molded body, there is a reactor which is an inductance part.

In hybrid vehicles, fuel cell vehicles, electric vehicles, or the like, a booster circuit is provided between a battery and an inverter which supplies alternating current power to a motor (electric motor), and a reactor (choke coil) which is an inductance part is used in the booster circuit.

For example, in hybrid vehicles, a maximum voltage of the battery is approximately 300 V. On the other hand, it is necessary to apply a high voltage of approximately 600 V to the motor so as to obtain large output. Therefore, a reactor is used as a part for the booster circuit.

A reactor is widely used for the booster circuit in photovoltaic power generation, or the like.

Conventionally, as the reactor, there has been generally used one in which an electric coil (hereinafter, the electric coil may be simply referred to as a "coil") is wound around the periphery of a core which is configured so that a pair of U-shaped core pieces is disposed in a state where a predetermined gap is generated between end surfaces of each of the core pieces.

However, in the case of this type of reactor, since the coil is exposed to the outside, there are problems in that coil vibration occurs according to excitation of the coil, the vibration becomes noise, a size of the gap between the coil pieces should be determined with high accuracy, an assembly process between the core and the coil is needed, and the like. Therefore, there has been proposed a reactor in which a core is configured of a molded body (soft magnetic resin molded body) including a mixture of a soft magnetic powder and a resin and the coil is integrally included in a state of being embedded in the inner portion of the core.

For example, Patent literature 1 and Patent literature 2 below disclose this type of reactor and a method of manufacturing the same.

In methods of manufacturing the reactor described in Patent literature 1 and Patent literature 2, a mixture, in which soft magnetic powder is mixed so as to be a dispersion state in liquid of a thermosetting resin, is injected into the inner portion of an outer case or a container in a state where a coil is set to the inner portion of the outer case or the container, and thereafter, this is heated to a predetermined temperature and the resin liquid is subjected to a hardening reaction for a predetermined time, so that a core is integrated with the coil at the same time when the core is molded.

In the case of the reactor which is obtained in this way, there are advantages that occurrence of noise due to the coil vibration can be prevented, setting the gap between the core piece and the core piece with high accuracy is not needed (a minute gap is formed between the soft magnetic powders of the molded body core), the assembly process between the core and the coil is not needed, the coil can be protected from the outside by the core (soft magnetic resin molded body), and the like.

However, in this case where the liquid of the thermosetting resin in which the soft magnetic powder is mixed in a dispersion state is injected into the container in the state where the coil is set into the container, as shown in a schematic view of FIG. 10, the soft magnetic powder 14 (hard metal iron powder or the like is used as the soft magnetic powder 14) strongly strikes an insulating coating 12 on a surface of a wire 11 of the coil 10 or scratching occurs (in the case of the core of the reactor, generally, approximately 50 to 70% in terms of volume % of the soft magnetic powder such as the iron powder is contained) due to the injection pressure or the flow pressure at the time of the injection, and whereby, there occurs a problem that damage such as tearing of the insulating coating 12 on the surface of the coil 10 occurs.

In general, a coil with attached insulating coating is used as the coil 10, in which a wire 11 in which the insulating coating 12 has been attached and formed on the outer surface thereof in advance is wound. Generally, a liquid (varnish) having a predetermined viscosity, which is formed by dissolving an insulating resin (for example, polyimide-imide) in a solvent, is coated on the entire outer surface of the wire 11 which forms the coil 10, and thereafter, the coated wire is subjected to a drying and a hardening reaction for film formation, whereby the insulating coating 12 is obtained. However, the film thickness of the insulating coating 12 is thin at approximately 25 μm, and the insulating coating 12 may be damaged if the soft magnetic powder 14 such as iron powder strongly strikes the insulating coating 12 or scratching occurs at the time of molding the core.

If the insulating coating 12 is damaged in this way, insulating performance of the coil 10 is decreased, and voltage resistance (resistance to dielectric breakdown voltage) characteristics in the reactor are decreased.

In addition, when the coil is set into the container and the mixture of the soft magnetic powder and the liquid of the thermosetting resin is injected, there occurs a problem that the coil is deformed due to the injection pressure or the flow pressure.

The coil itself is simply deformed by elongation like an accordion or is easily deformed by twisting, and when the mixture of the soft magnetic powder and the liquid of the thermosetting resin is injected into the container, the coil is easily deformed due to the injection pressure or the flow pressure.

If the coil is deformed in this way, the performance as the reactor is deteriorated.

In addition, there occurs a problem that stress is added to the insulating coating due to hardening shrinkage when the thermosetting resin is hardened, and the insulating coating is damaged by the stress also at that time.

Moreover, as another method of manufacturing the reactor, a method is considered in which the coil is set into a cavity of a molding die and the mixture of the soft magnetic powder and a thermoplastic resin are injected into the cavity, so that the core is whereby injection-molded and also the coil is integrated in a state of being embedded in the inner portion of the core.

Particularly, when the core is molded by means of the injection-molding, there occurs a problem that, since the coil is easily deformed due to a strong injection pressure and flow pressure and the soft magnetic powder strongly strikes the insulating coating 12 of the coil or the scratching occurs, the insulating coating is more easily damaged.

In addition, particularly, when the core is molded by means of the injection-molding, there occurs a difficult problem that a thermal stress is added to the insulating coating due to expansion through the beating and shrinkage through cooling at the time of molding, and the insulating coating is thus damaged due to the thermal stress.

For example, the temperature of the thermoplastic resin that includes the soft magnetic powder at the time of the injection into the cavity of the molding die is 300° C. or more in a liquid of a molten state, and after the injection, it is cooled through the molding die and solidified, and becomes a molded body.

At this time or thereafter, in the process in which the molded body is taken out from the molding die and is cooled to room temperature, the core which is the molded body is largely shrunk. Accordingly, great stress acts on the insulating coating of the coil due to difference of shrinkage amount between the core and the coil when the core is shrunk, and thus, distortion occurs on the insulating coating, and the insulating coating is broken or damaged due to the distortion, or the like.

This also adversely affects the voltage resistance characteristics of the reactor.

In addition, as described above, since the film thickness of the insulating coating on the wire surface in the coil is originally thin, there is a problem in that reliability of the voltage resistance characteristics is not sufficient.

The above case is the case where the coil with attached insulating coating is used. However, even when the coil with attached insulating coating is not used, and a coil in which the wire is configured to be wound in a state where an insulating layer is interposed between uncoated wires is used, there are problems that the coil is deformed at the time of molding a core, the reliability of the voltage resistance characteristics is not sufficient, and the like, which are similar to the case where the coil with attached insulating coating is used.

Therefore, as measures against the above-described problems, it is considered that the coil may be encased in a state of being enclosed with an electrically insulating resin so that the coil becomes an encased coil body in advance, and in this state, the core is molded in a state where this is integrally included in the core.

Conventionally, for example, Patent literature 1 and Patent literature 3 below describe that the coil is made into such an encased coil body, However, as the method of molding the encased coil body, specifically, as the method of manufacturing the resin covering layer, a method in which a thermoplastic resin is used and the resin is injection-molded is a suitable method because the molding can be performed in a short time and productivity is high. However, even in this case, how to hold the coil in the state of being positioned in the cavity of the molding die and how to prevent the deformation of the coil due to the injection pressure or the flow pressure become great problems.

If the coil is largely deformed at the time of molding, characteristics of the reactor deteriorate similarly as described above.

Problems of the encased coil body used in a reactor are described above with taking the reactor as an example,. However, the problems may similarly occur also in an encased coil body which is used in a coil composite molded body, other than the reactor.

CITATION LIST

Patent Literature

Patent literature 1: JP-A-2007-27185
Patent literature 2: JP-A-2008-147405
Patent literature 3: JP-A-2006-4957

SUMMARY OF THE INVENTION

Problems that the Invention is to Solve

The present invention has been made in consideration of the above-described circumstances, and an object thereof is to provide a method of manufacture for an encased coil body which enables easily manufacturing an encased coil body in which the coil is configured so as to be encased in a state of being enclosed with an electrically insulating resin, and which enables favorably manufacturing the encased coil body by holding the coil in a state of being positioned and preventing deformation of the coil at that time; as well as an encased coil body.

Means for Solving the Problems

Claim 1 relates to a method of manufacture for an encased coil body which is to be provided in a state of being embedded in an inner portion of a core containing a soft magnetic powder, in which the encased coil body includes an electric coil which is configured by winding a wire in a state where an insulating layer is interposed between said wires, and an electrically insulating thermoplastic resin which encases the electric coil in a state of entirely enclosing the electric coil from the outside, the method comprising injection-molding a resin covering layer which encases the coil with a thermoplastic resin, wherein the injection-molding is conducted such that said injection-molding step is divided into a primary molding step and a secondary molding step, wherein the primary molding step includes contacting a primary molding die for the resin covering layer with an inner circumferential surface or an outer circumferential surface of the coil, and injecting a resin material into a primary molding cavity of the primary molding die which is formed on the outer circumferential side or the inner circumferential side of the coil in a state where the coil is constrained by the primary molding die so as to be positioned in a radial direction in the inner circumferential surface or the outer circumferential surface, thereby molding a primary molded body which includes an outer circumferential covering portion or an inner circumferential covering portion in the resin covering layer and also integrating the primary molded body and the coil, and the secondary molding step includes, after the primary molding step, setting the primary molded body along with the coil to a secondary molding die for the resin covering layer, and injecting the resin material into a secondary molding cavity of the secondary molding die which is formed on the inner circumferential side or the outer circumferential side of the coil, thereby molding a secondary molded body which includes the inner circumferential covering portion or the outer circumferential covering portion in the resin covering layer and also integrating the secondary molded body, the coil, and the primary molded body.

Claim 2 relates to a method of manufacture for an encased coil body according to claim 1, wherein the coil is a coil with an insulating coating attached, which is configured by winding a wire in which the insulating coating has been attached and formed on an outer surface thereof in advance.

Claim 3 relates to a method of manufacture for an encased coil body according to claim 1 or 2, wherein one molded body of the primary molded body and the secondary molded body, which includes the outer circumferential covering portion, includes an end surface covering portion which covers one axial end surface of the coil, and the other molded body of the primary molded body and the secondary molded body, which includes the inner circumferential covering portion, includes another end surface covering portion which covers the other axial end surface of the coil.

Claim 4 relates to an encased coil body which is to be provided in a state of being embedded in an inner portion of a core containing a soft magnetic powder, said encased coil body comprising an electric coil which is configured by winding a wire in a state where an insulating layer is interposed between said wires, and an electrically insulating thermoplastic resin which encases the electric coil in a state of entirely enclosing the electric coil from the outside, wherein a molded body which includes an outer circumferential covering portion covering an outer circumferential surface of the coil and another molded body which includes an inner circumferential covering portion covering an inner circumferential surface of the coil are jointed and integrated to form a resin covering layer of the encased coil body.

Advantage of the Invention

As described above, the method of manufacture for the encased coil body of the present invention molds the encased coil body (in a precise sense, resin covering layer) by the injection-molding, and the injection-molding is conducted with dividing the step of the injection-molding into a primary molding step and a secondary molding step.

According to the method of the manufacture, in the primary molding step, the resin material is injected into a primary molding cavity of the primary molding die which is formed on the outer circumferential side or the inner circumferential side of the coil in a state where the primary molding die for the resin covering layer is brought into contact with the inner circumferential surface or the outer circumferential surface of the coil so that the coil is constrained so as to be positioned in the radial direction, whereby the primary molded body which includes the outer circumferential covering portion or the inner circumferential covering portion in the resin covering layer is molded and also the primary molded body and the coil are integrated with each other.

Moreover, in the secondary molding step, after the first molding step, the primary molded body along with the coil is set to a secondary molding die, and the resin material is injected into a secondary molding cavity of the secondary molding die which is formed on the inner circumferential side or the outer circumferential side of the coil, whereby the secondary molded body which includes the inner circumferential covering portion or the outer circumferential covering portion in the resin covering layer is molded, and the secondary molded body, the coil, and the primary molded body are integrated with one another.

According to this method of the manufacture, the molding is performed so as to be divided into at least two moldings when the encased coil body is injection-molded. Accordingly, the encased coil body, that is, the resin covering layer can be favorably injection-molded in the state where the coil is held so as to be favorably positioned by the molding die, it is possible to favorably prevent the coil from positional misalignment or deformation due to an injection pressure or a flow pressure at the time of the molding, and the resin covering layer can be favorably molded in a sufficient thickness in the state where the coil is encased.

Incidentally, in the secondary molding step, in general, the resin material is injected into the secondary molding cavity of the secondary molding die formed on the inner circumferential side or the outer circumferential side of the coil in which the covering portion is not formed in a state where the secondary molding die is brought into contact with the outer circumferential covering portion or the inner circumferential covering portion of the primary molded body molded in advance so that the coil and the primary molded body are constrained so as to be positioned in the radial direction, and the secondary molded body is thus molded.

Here, the coil may be a coil with attached insulating coating (claim 2).

Moreover, when one molded body of the primary molded body and the secondary molded body which includes the outer circumferential covering portion is molded, the end surface covering portion which covers one axial end surface of the coil may also be molded, and when the other molded body which includes the inner circumferential covering portion is molded, the end surface covering portion which covers the other axial end surface of the coil may also be molded (claim 3).

Claim 4 relates to an encased coil body, and in the encased coil body, a molded body which includes the outer circumferential covering portion covering an outer circumferential surface of the coil and another molded body which includes the inner circumferential covering portion covering the inner circumferential surface are jointed and integrated to form a resin covering layer formed by a thermoplastic resin, and since the encased coil body is configured in this way, the encased coil body can be manufactured by the method of manufacture according to claim 1.

MODE FOR CARRYING OUT THE INVENTION

Next, hereinafter, an embodiment in a case where the present invention is applied to an encased coil body which is used in a reactor (choke coil) as an inductance part will be described in detail with reference to the drawings.

Figure 1:
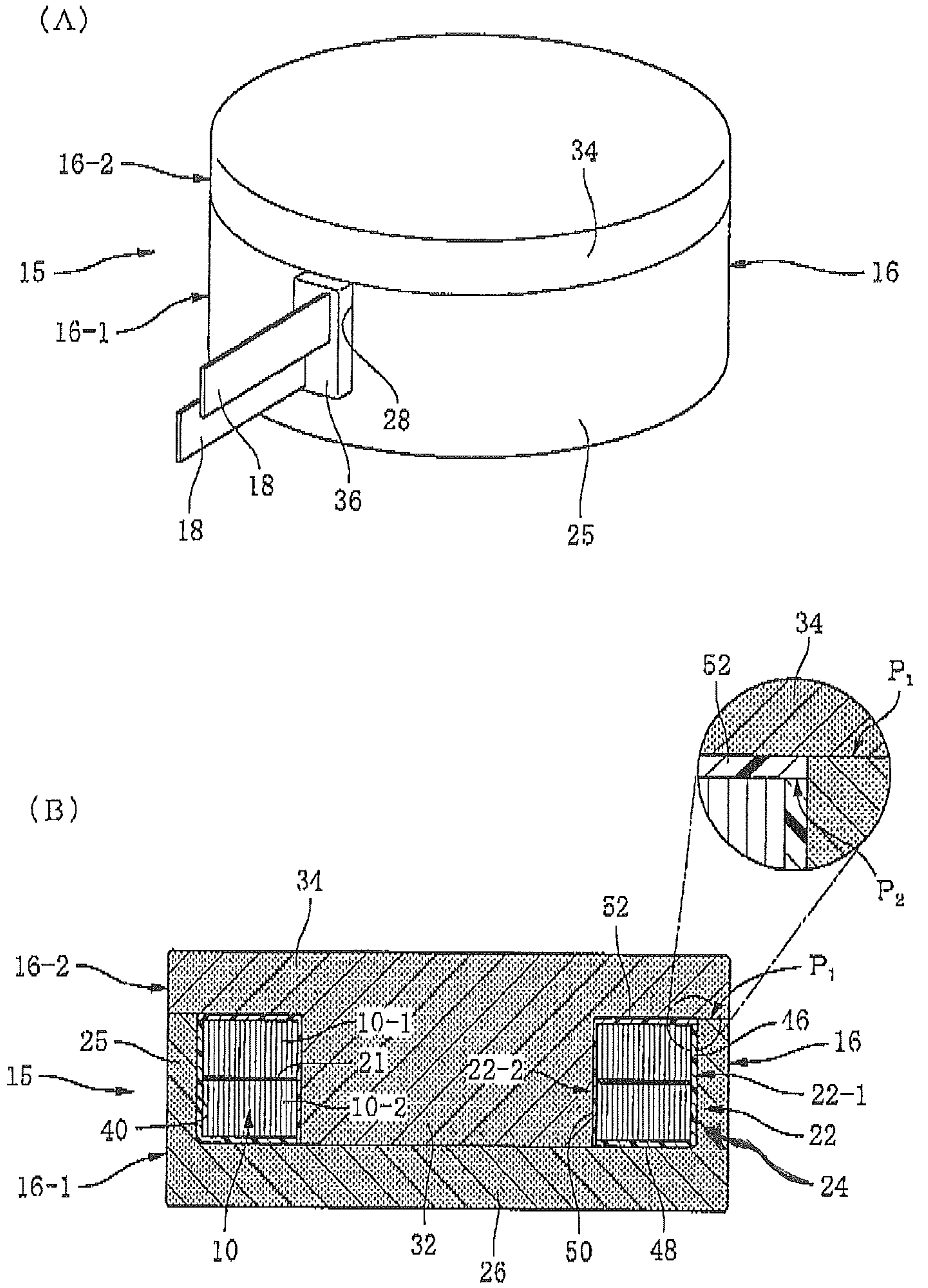
FIG. 1 describes views showing an encased coil body according to an embodiment of the present invention along with a reactor.

In FIG. 1, a reference numeral 15 is the reactor which is an example of a coil composite molded body, and a coil 10 with attached insulating coating is integrated with the inner portion of a core 16 formed of a soft magnetic resin molded body so as to be an embedded state as an encased coil body 24 described below. That is, the core 16 is manufactured so as to form a reactor having a structure with no gap.

In this embodiment, as shown in FIG. 3 to FIG. 5(A), the coil 10 is a flat-wise coil and is formed in a coil shape by winding and superposing a rectangular wire in the thickness direction (radial direction) of the wire, in which wires adjacent in the radial direction in a state of a free shape which are processed to be wound and are molded to be superposed so as to be a state of being in contact with one another via the insulating coating.

Figure 3:
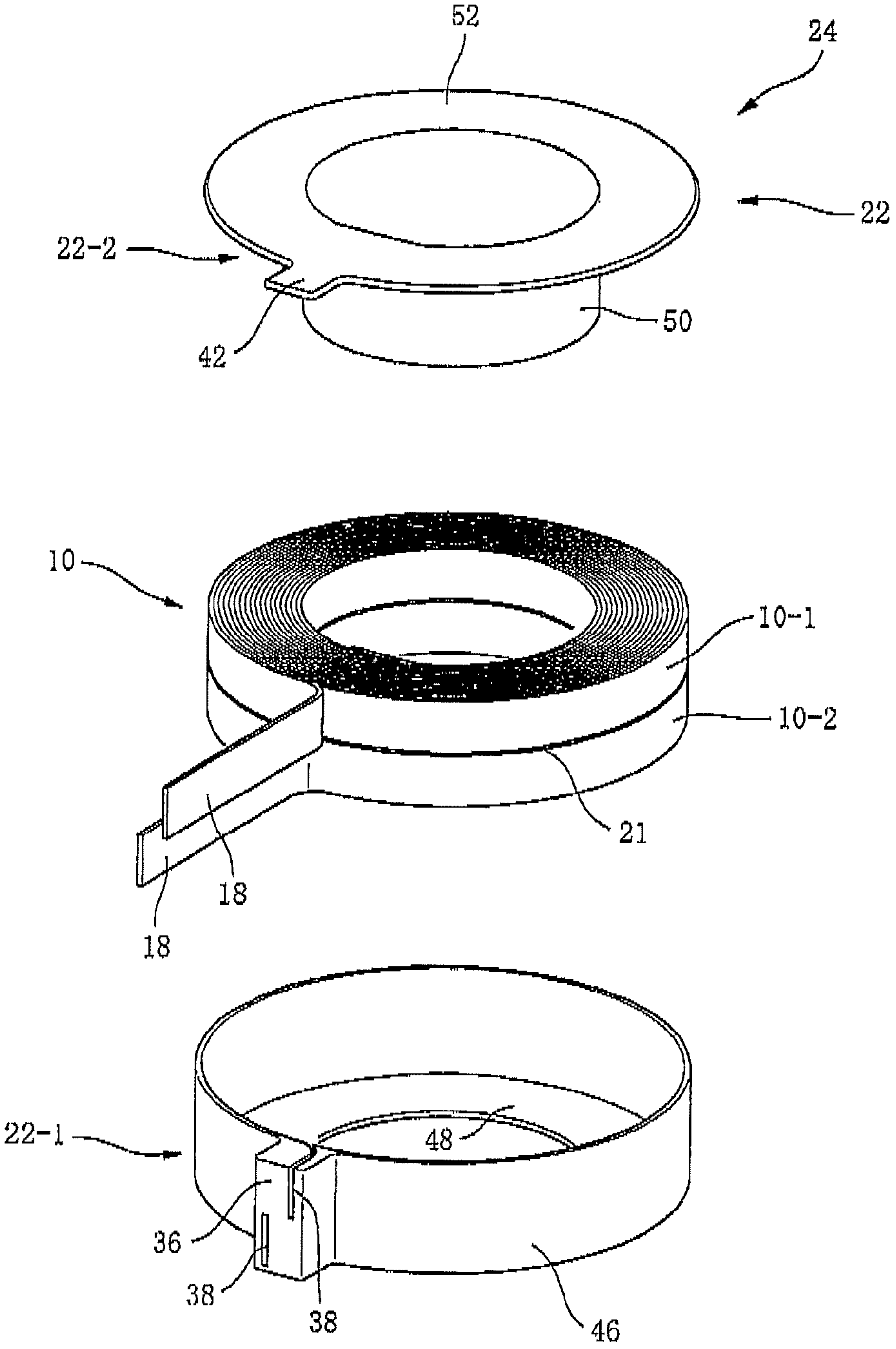
FIG. 3 is a perspective view in which the encased coil body of FIG. 2 is exploded into a resin covering layer and a coil, and illustrated.
Figure 4:
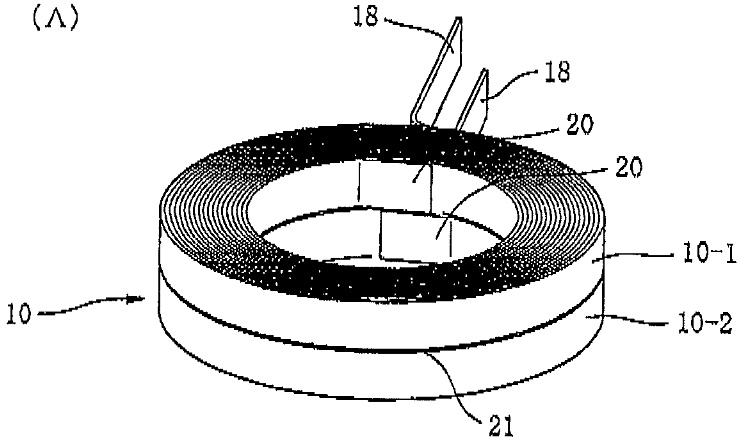
FIG. 4 describes a view when the coil of FIG. 3 is viewed from another angle and a view in which the coil is exploded into an upper and lower coils and illustrated.
Figure 4:
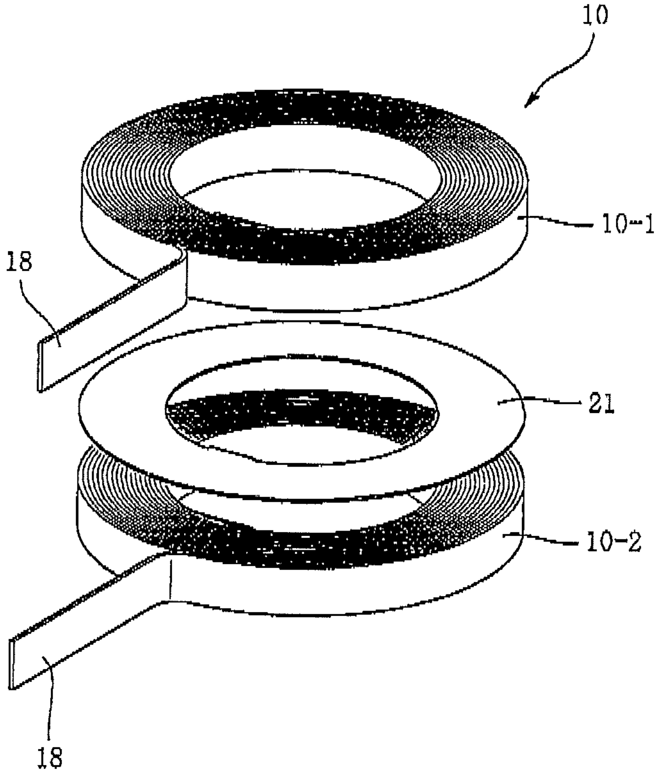

In the present embodiment, as shown in FIGS. 3 and 4, an upper coil 10-1 and a lower coil 10-2 are superposed to each other in up and down directions so that the winding directions are opposite to each other, and ends 20 in each of the inner diameter sides are jointed to each other, whereby the coil 10 is configured of a single continuous coil 1. However, the upper coil 10-1 and the lower coil 10-2 may be configured so as to be continuous by means of a single wire.

In addition, since a large electrical potential difference is generated between the upper coil 10-1 and the lower coil 10-2, as shown in FIG. 4(B), an annular insulating sheet 21 is interposed therebetween. Herein, the thickness of the insulating sheet 21 is approximately 0.5 mm.

Moreover, a reference number 18 in the drawings indicates coil terminals in the coil 10, and the coil terminals are formed so as to protrude outside in the radial direction.

As shown in FIG. 5(A), the planar shape of the coil 10 is an annular shape.

As shown in FIG. 1, the coil 10 is integrally included in the core 16 in a state of being entirely embedded in the core 16 except for a portion of the tip side of the coil terminal 18.

In this embodiment, various materials such as copper, aluminum, copper alloy, and aluminum alloy may be used for the coil 10 (Incidentally, the coil 10 is made of copper in this embodiment).

In this embodiment, the core 16 is configured of a molded body which is obtained by injection-molding a mixture containing a soft magnetic powder and a thermoplastic resin.

Here, soft magnetic iron powder, sendust powder, ferrite powder, or the like may be used for the soft magnetic powder. Moreover, for example, as the thermoplastic resin, PPS (polyphenylene sulfide), PA12 (polyamide 12), PA6 (polyamide 6), PA6T (polyamide 6T), POM (polyoxymethylene), PE (polyethylene), PES (polyether sulfone), PVC (polyvinyl chloride), EVA (ethylene-vinyl acetate copolymer), or the like may be suitably used.

A proportion of the soft magnetic powder that occupies the core 16 may be varied variously, and the ratio is preferably approximately 50 to 70% in terms of volume %.

The entirety of the coil 10 with attached insulating coating is encased by an electrically insulating resin from the outside except for a portion of the tip side of the coil terminal 18.

Figure 2:
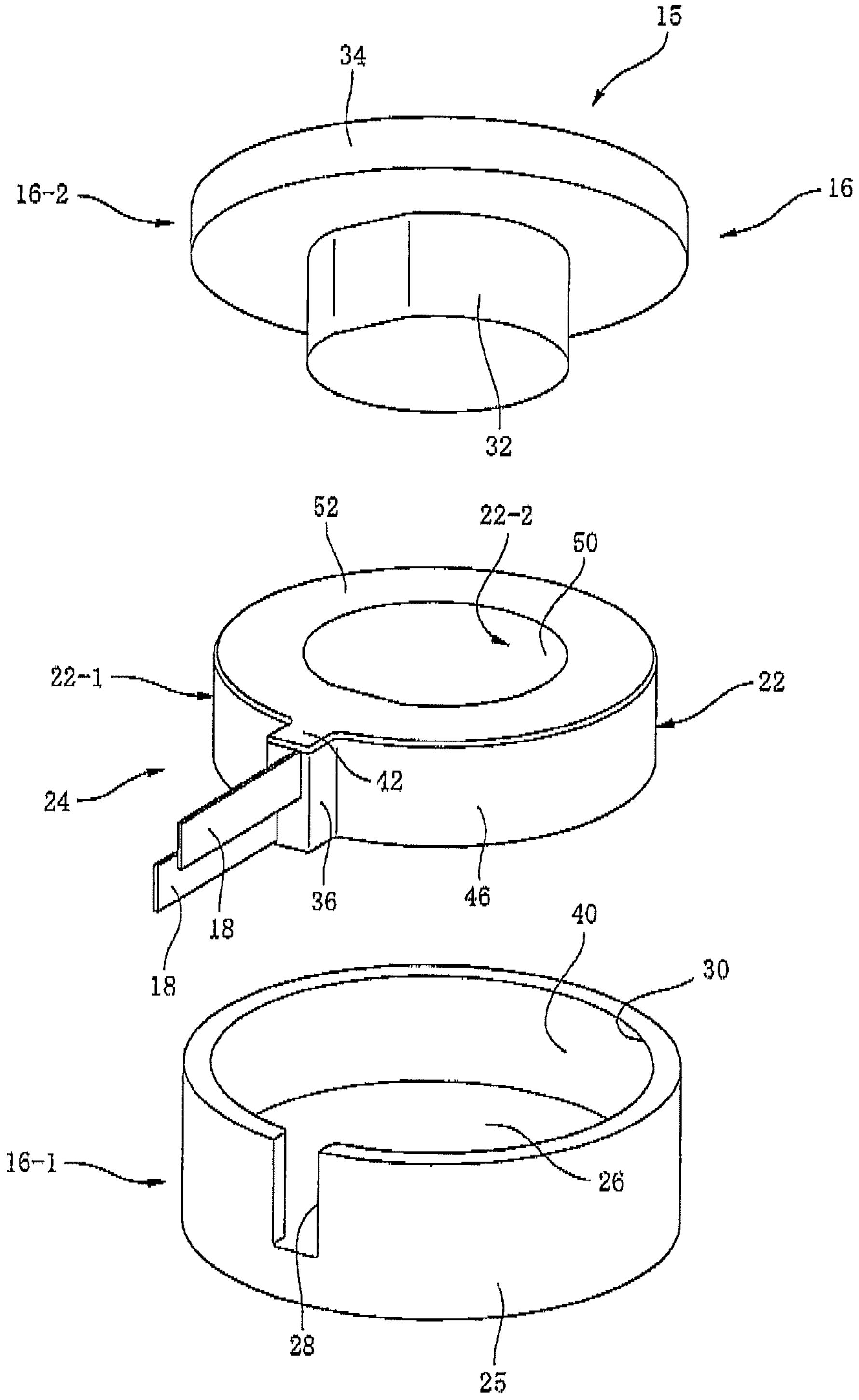
FIG. 2 is a perspective view in which the reactor shown in FIG. 1 is exploded and illustrated.

In FIGS. 1 and 2, a reference numeral 24 indicates the encased coil body which is configured of the coil 10 and the resin covering layer 22, in which the coil 10 is embedded in the inner portion of the core 16 as the encased coil body 24.

In this embodiment, it is preferable that the thickness of the resin covering layer 22 be 0.5 to 2.0 mm.

The resin covering layer 22 is configured of an electrically insulative thermoplastic resin which does not contain a soft magnetic powder. As the thermoplastic resin, in addition to PPS, PA12, PA6, PA6T, POM, PE, PBS, PVC, and EVA, other various materials may be used.

Also as shown in an exploded view of FIG. 2, a primary molded body 16-1 and a secondary molded body 16-2 are jointed to each other through an injection-molding at a boundary surface P1 shown in FIG. 1(B), so that the molded bodies are integrated to constitute the core 16.

As shown in FIGS. 1 and 2, the primary molded body 16-1 has a container-like shape that includes a cylindrical outer circumferential molded portion 25 which contacts the outer circumferential surface of the encased coil body 24 and a bottom portion 26 positioned at the lower side of the encased coil 24 in the drawings, in which an opening 30 is present at the upper end in a coil axis line direction in the drawings.

Moreover, a cutout portion 28 is provided on the outer circumferential molded portion 25 of the primary molded body 16-1.

The cutout portion 28 is one for inserting a thick portion 36 (refer to FIG. 2) of the encased coil body 24 described below.

On the other hand, also as shown in FIG. 2, the secondary molded body 16-2 integrally includes an inner circumferential molded portion 32 which contacts the inner circumferential surface of the encased coil body 24, fills a blank space of the inner side of the coil 10, and reaches the bottom portion 26 in the primary molded body 16-1, and an upper circular cover portion 34 which is positioned upward from the encased coil body 24 in the drawings, closes the opening 30 of the primary molded body 16-1, and conceals a recess 40 of the primary molded body 16-1 and the encased coil body 24 accommodated in the recess in the inner portion.

On the other hand, as shown in an exploded view of FIG. 3, the resin covering layer 22 which encases the coil 10 is configured of a primary molded body 22-1 and a secondary molded body 22-2, and they are integrated with each other by joining through an injection-molding at a boundary surface P2 shown in FIG. 1(B).

The primary molded body 22-1 integrally includes a cylindrical outer circumferential covering portion 46 which covers the outer circumferential surface of the coil 10 and a lower covering portion (end surface covering portion) 48 which covers the entire lower end surface of the coil 10.

On the other hand, the secondary molded body 22-2 integrally includes a cylindrical inner circumferential covering portion 50 which covers the inner circumferential surface of the coil 10 and an upper covering portion (end surface covering portion) 52 which covers the entire upper end surface of the coil 10.

Moreover, the thick portion 36 which protrudes outward in the radial direction is formed over the entire height in the primary molded body 22-1, and a pair of slits 38 which penetrates the thick portion 36 in the radial direction is formed in the thick portion 36.

The pair of coil terminals 18 in the coil 10 penetrates the silts 38 and protrudes outward in the radial direction of the primary molded body 22-1.

In addition, a tongue-shaped protrusion 42 which protrudes outward in the radial direction is integrally formed with the upper covering portion 52 in the secondary molded body 22-2. The upper surface of the thick portion 36 in the primary molded body 22-1 is covered by the protrusion 42.

In FIGS. 2 to 9, a method of manufacturing the reactor 15 of FIG. 1 is specifically shown along with a method of manufacturing the encased coil body.

Figure 5:
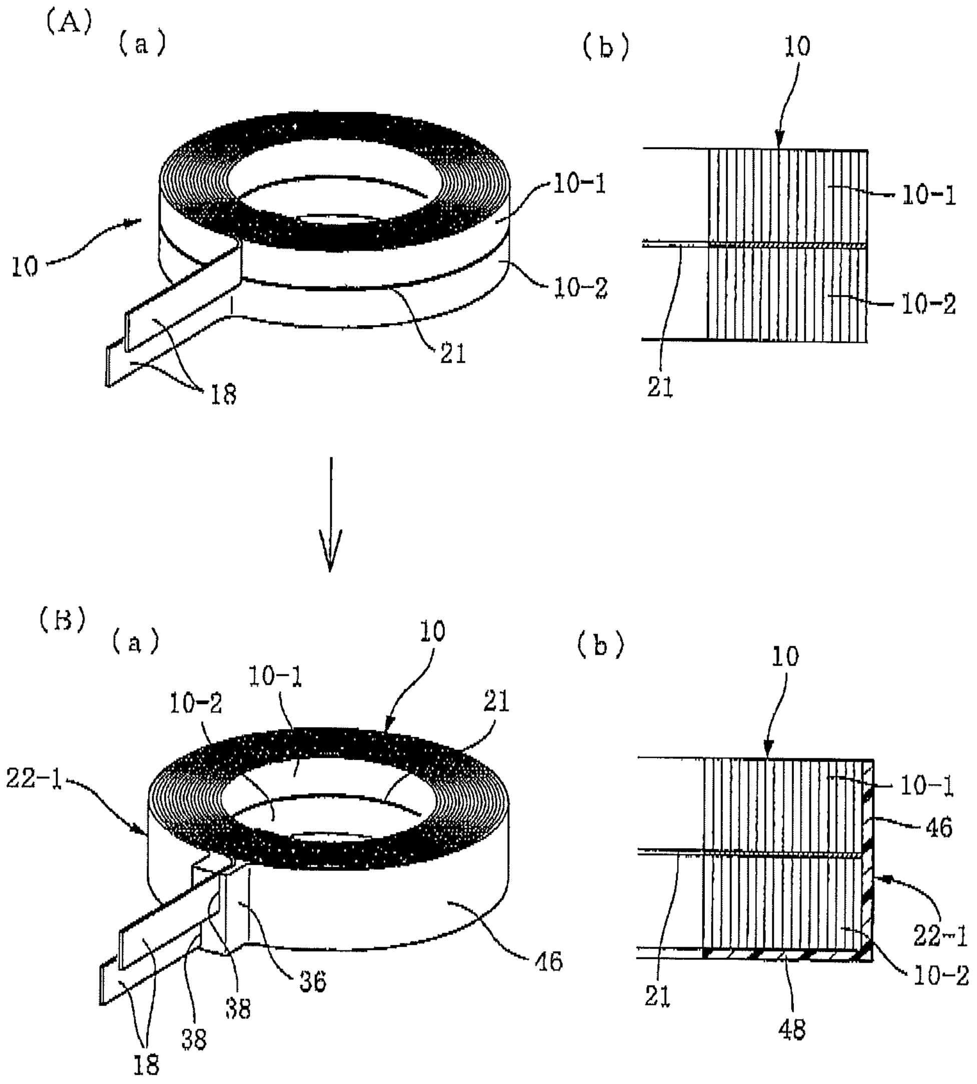
FIG. 5 describes explanatory views of a molding procedure of the encased coil body of the embodiment.
Figure 6:
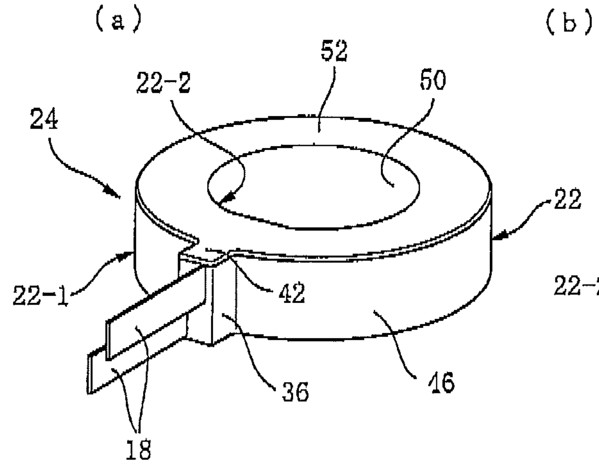
FIG. 6 describes an explanatory view of the molding procedure following FIG. 5.
Figure 6:
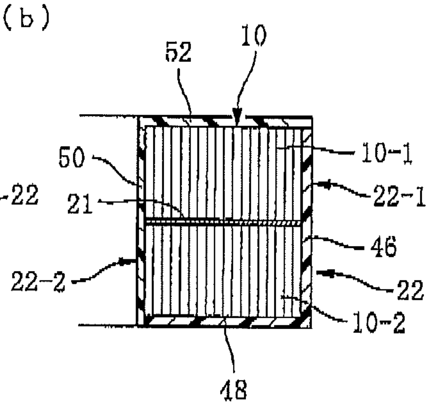
Figure 6:
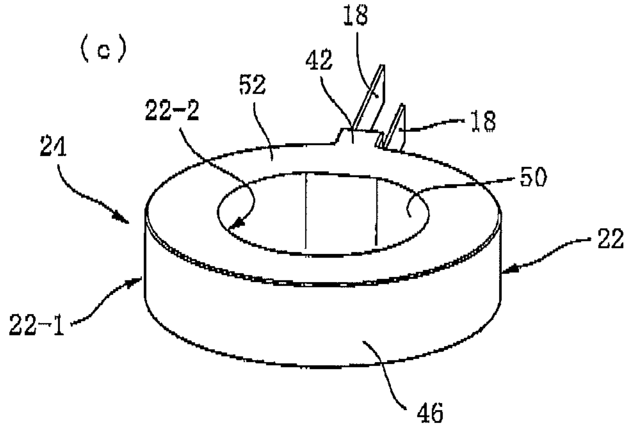

In this embodiment, according to a procedure shown in FIGS. 5 and 6, the resin covering layer 22 is formed so as to enclose the coil 10 with attached insulating coating shown in FIG. 5(A) from the outside, and the encased coil body 24 is configured by integrating the coil 10 and the resin covering layer 22.

Herein, as shown in FIG. 5(B), the primary molded body 22-I which integrally includes the outer circumferential covering portion 46 and the lower covering portion 48 is firstly molded, and thereafter, as shown in FIG. 6(C), the secondary molded body 22-2 which integrally includes the inner circumferential covering portion 50 and the upper covering portion 52 is molded, whereby the entire resin covering layer 22 is molded.

Figure 8:
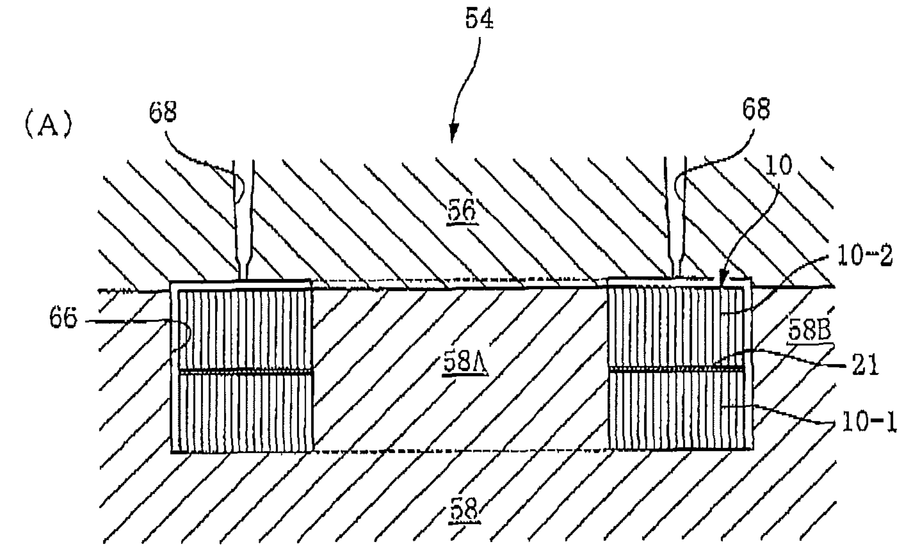
FIG. 8 describes explanatory views of a method of molding the encased coil body in the embodiment.
Figure 8:
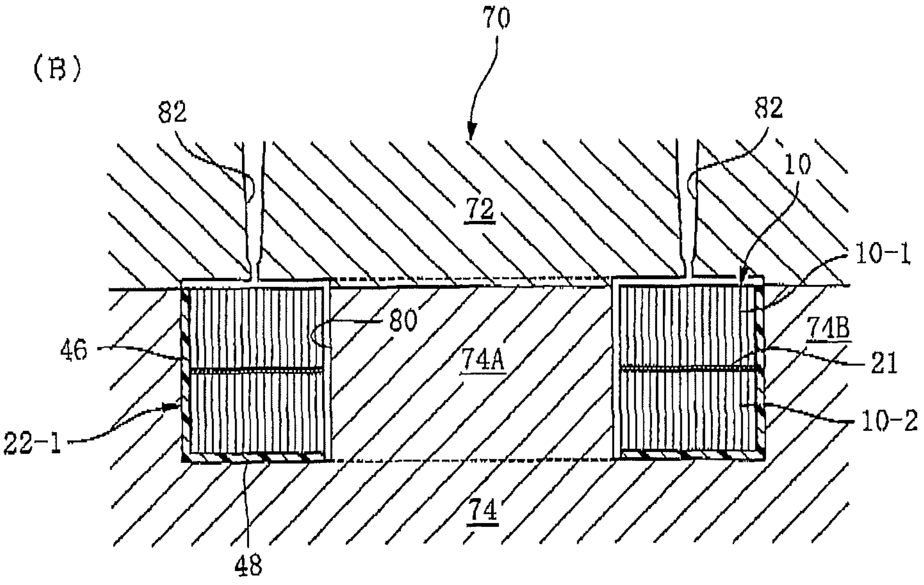

FIG. 8 shows a specific molding method at the time of molding the entire resin covering layer.

In FIG. 8(A), a reference numeral 54 indicates a primary molding die for the encased coil body 24, specifically, for the resin covering layer 22, and the primary molding die includes art upper die 56 and a lower die 58.

Here, the lower die 58 includes a middle die portion 58A and an outer die portion 58B.

In a primary molding which uses the primary molding die 54 shown in FIG. 8(A), the coil 10 is firstly set to the primary molding die 54. At this time, the coil 10 is set so that the direction shown in FIG. 3 is turned upside down.

Specifically, the lower coil 10-2 is positioned at the upper side and the upper coil 10-1 is positioned at the lower side, so that the coil is set to the primary molding die 54 so as to be turned upside down.

Moreover, the middle die portion 58A is brought into contact with the inner circumferential surface of the coil 10, whereby the inner circumferential surface of the coil 10 is held so as to be constrained in the radial direction by the middle die portion 58A.

Then, a resin (thermoplastic resin) material is injected to a cavity 66, which is formed on the outer circumferential side of the coil 10 of the primary molding die 54, through a passage 68, and the primary molded body 22-1 of the resin covering layer 22 shown in FIGS. 1 and 5(B) is injection-molded.

Specifically, the primary molded body 22-1 of the resin covering layer 22, which integrally includes the outer circumferential covering portion 46 and the lower covering portion 48 shown in FIG. 8(B), is injection-molded.

After the primary molded body 22-1 of the resin covering layer 22 is molded in this way, the primary molded body 22-1 is set to a secondary molding die 70 shown in FIG. 8(B) along with the coil 10 which is integrated with the primary molded body 22-1.

At this time, as shown in FIG. 8(B), the coil 10 is set to the secondary molding die 70 so as to be turned upside down along with the primary molded body 22-1.

The secondary molding die 70 includes an upper die 72 and a lower die 74. In addition, the lower die 74 includes a middle die portion 74A and an outer die portion 74B.

In a state where the primary molded body 22-1 is set along with the coil 10, the secondary molding die 70 is brought into contact with the outer circumferential covering portion 46 of the primary molded body 22-1, so that the coil 10 is positioned in the radial direction along with the outer circumferential covering portion 46 and held so as to be constrained, and at the same time, it is brought into contact with the lower encasing portion 48, so that the coil 10 is positioned in up and down directions along with the lower covering portion 48. Moreover, in that state, a cavity 80 is formed on the inner circumferential side and the upper side of the coil 10.

In the secondary molding using the secondary molding die 70, the same resin material as the resin material at the time of the primary molding is injected to the cavity 80 through a passage 82, and the secondary molded body 22-2 in the resin covering layer 22 is injection-molded and simultaneously, the secondary molded body is integrated with the primary molded body 22-1 and the coil 10.

In the present embodiment, the encased coil body 24 which is molded as mentioned above is integrated with the core 16 at the time of molding of the core 16 of FIG. 1.

Figure 7:
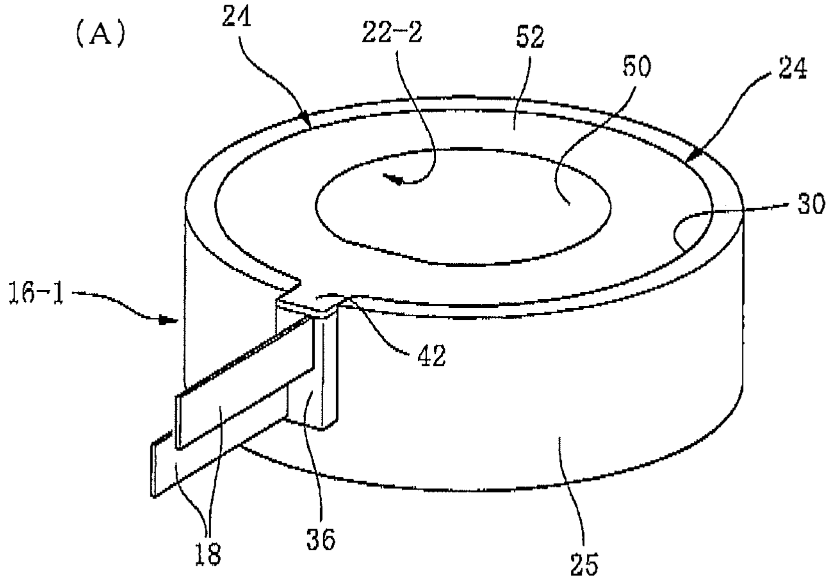
FIG. 7 describes process explanatory views of a method of manufacturing the reactor of FIG. 1.
Figure 7:
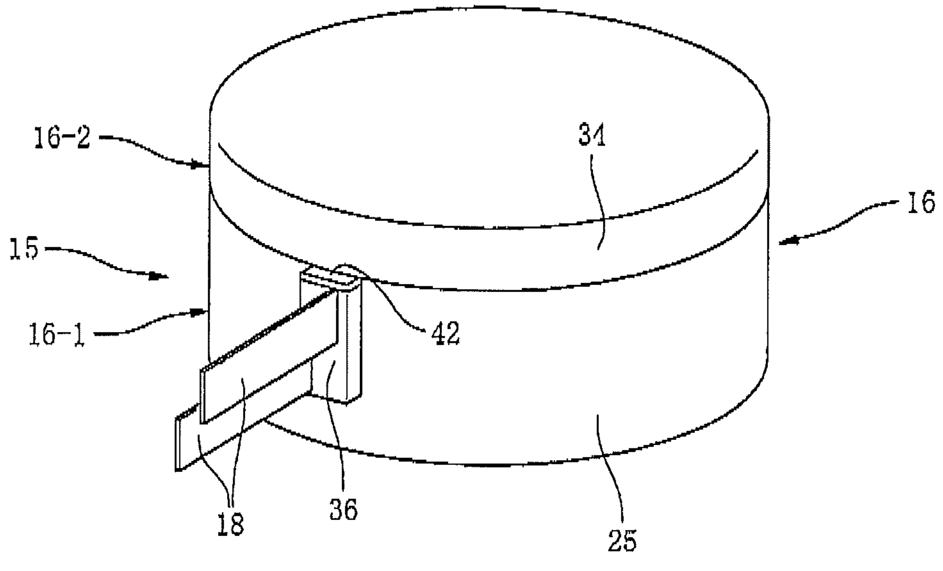
Figure 9:
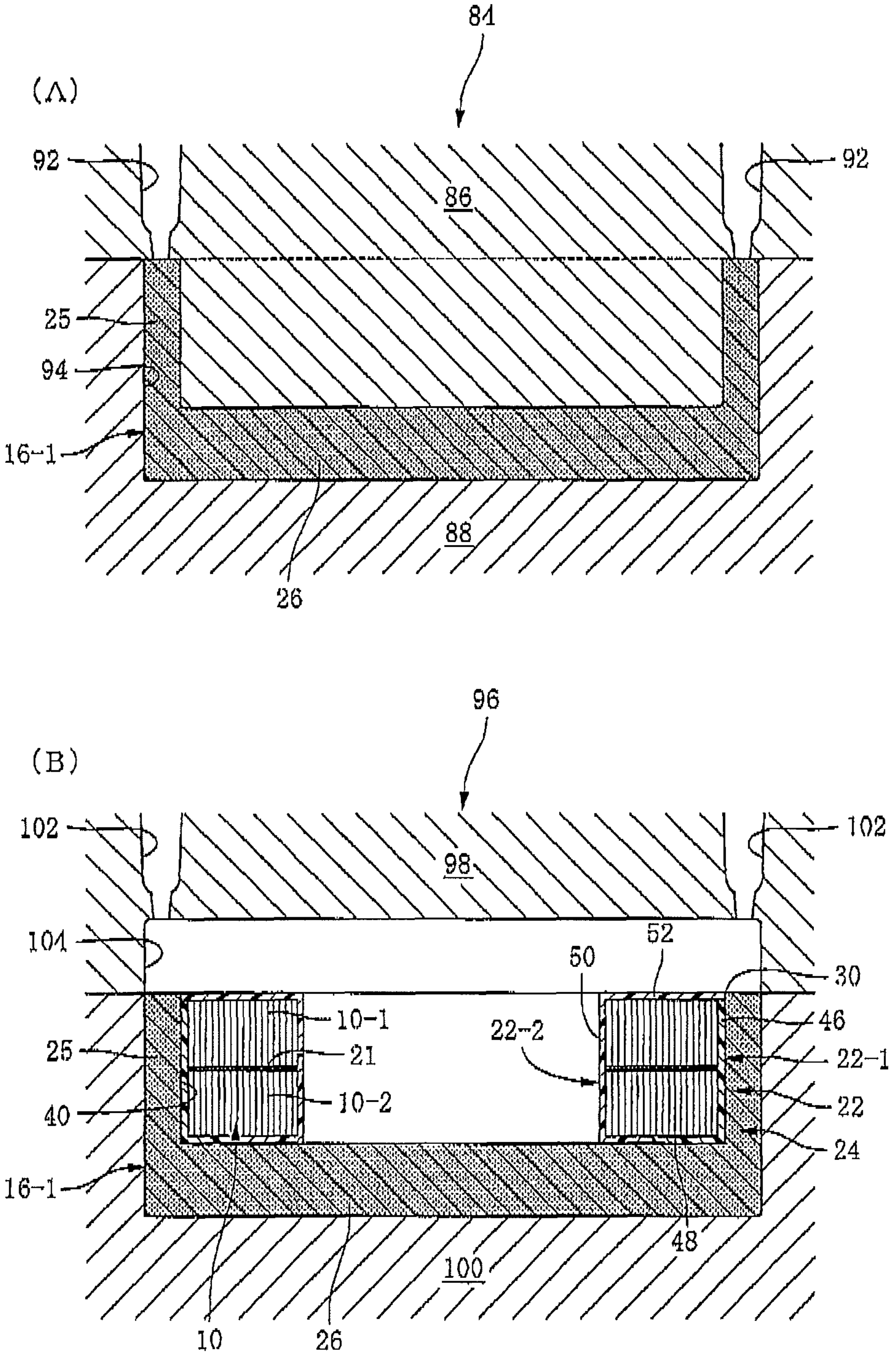
FIG. 9 describes explanatory views of a method of molding the core in the reactor of FIG. 1.
Figure 10:
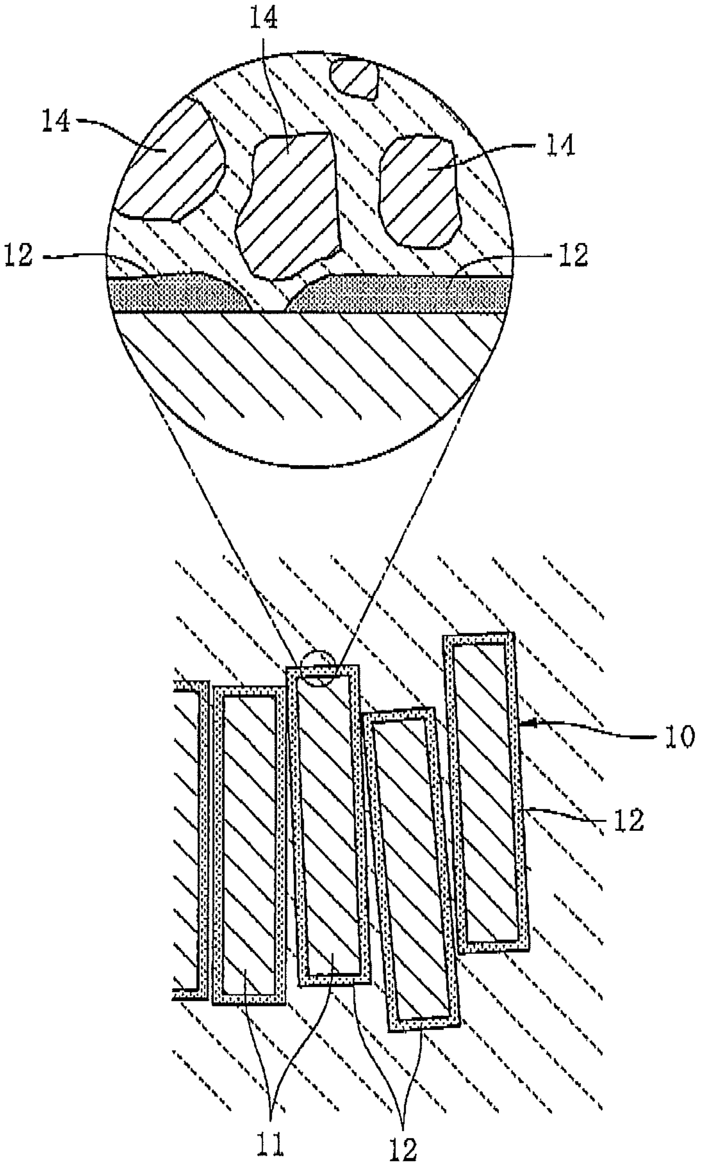
FIG. 10 is a view schematically showing problems in the background of the present invention.

The specific procedures are illustrated in FIGS. 7 and 9.

In this embodiment, when the entire core 16 is molded, as shown in FIG. 7, the primary molded body 16-1 having a container shape is firstly molded in advance.

Thereafter, as shown in FIG. 7(A), the encased coil body 24 molded according to the procedure shown in FIGS. 5 and 6 is inserted into the inner portion of the recess 40 of the primary molded body 16-1 having a container shape over the entire height downward in the drawings through the opening 30 of the primary molded body 16-1, so that the encased coil body 24 is held by the primary molded body 16-1.

Moreover, in that state, the primary molded body 16-1 and the encased coil body 24 are set to the molding die, and the second molded body 16-2 in the core 16 is injection-molded so as to be integrated with the primary molded body 16-1 and the encased coil body 24.

FIG. 9(A) shows the primary molding die for the core 16 which molds the primary molded body 16-1.

A reference numeral 84 indicates the primary molding die which molds the primary molded body 16-1 and includes an upper die 86 and a lower die 88.

Here, the mixture of the soft magnetic powder and the thermoplastic resin is injection-molded to a cavity 94 through a passage 92, whereby the primary molded body 16-1 which integrally includes the outer circumferential molded portion 25 and the bottom portion 26 is molded.

FIG. 9(B) shows the secondary molding die which molds the secondary molded body 16-2 in the core 16.

A reference numeral 96 indicates the secondary molding die and includes an upper die 98 and a lower die 100.

In the secondary molding, the encased coil body 24 is firstly inserted into the molded primary molded body 16-1, and in a state of being held, these are set to the secondary molding die 96.

At this time, the outer circumferential surface of the primary molded body 16-1 contacts the entire circumference of the secondary molding die 96, and therefore, the primary molded body 16-1 is positioned in the radial direction. In addition, the lower surface of the bottom portion 26 is held in the state of being positioned in up and down directions in the secondary molding die 96.

That is, the encased coil body 24 is held so as to be positioned not only in the radial direction but also in the up and down directions in the secondary molding die 96 via the primary molded body 16-1.

In the secondary molding, in that state, the same mixture as that used at the time of the primary molding is injected into a cavity 104 through a passage 102 disposed further upward than the cavity 104 in the drawings, whereby the secondary molded body 16-2 of FIGS. 1(B), 2 and, 7(B) is molded, and simultaneously, the secondary molded body 16-2 is integrated with the primary molded body 16-1 and the encased coil body 24.

Here, the reactor 15 shown in FIGS. 1 and 7(B) is obtained,

According to the above-described embodiment, the encased coil body 24, that is, the resin covering layer 22 can be favorably injection-molded in the state where the coil 10 is held so as to be favorably positioned by the molding die, and at the time of the molding, it is possible to favorably prevent the coil 10 from being positionally misaligned or being deformed due to the injection pressure or the flow pressure, and the resin covering layer 24 can be favorably molded in the state where the coil 10 is encased.

EXAMPLES

A coil 10 was used in which the upper coil 10-1 and the lower coil 10-2 (both were a flat-wise coil having an outer diameter of ϕ80 mm, an inner diameter of ϕ47 mm, and a number of turns of 18, and one reversed and superposed to the other) configured by winding a rectangular wire (9 mm in width and 0.85 mm in thickness) with attached insulating coating (polyamide-imide film of 20 to 30 μm) were jointed so as to be superposed up and down and were integrated with each other, a linear-type PPS was used as the thermoplastic resin, and the primary molded body 22-1 of the resin covering layer 22 in the encased coil body 24 was molded.

At this time, in the primary molded body 22-1, the outer circumferential covering portion 46 was molded to have a thickness of 1 mm and the lower encasing portion 48 was molded to have a thickness of 1 mm.

Subsequently, the secondary molded body 22-2 was molded using the same PPS resin through the secondary molding die 70 for the resin covering layer 22.

At this time, in the secondary molded body 22-2, the inner circumferential covering portion 50 was molded to have a thickness of 0.5 mm and the upper encasing portion 52 was molded to have a thickness of 1 mm.

Moreover, at this time, the molding of the resin covering layer 22 was performed according to the following conditions. That is, the injection-molding was performed with an injection temperature of 320° C., a temperature of the molding die of 130° C., and an injection pressure of 147 MPa.

At the same time, the primary molded body 16-1 was injection-molded in the core 16 using the mixture in which the soft magnetic iron powder and the linear-type PPS were mixed at the combination ratio for making the ratio of the soft magnetic iron powder be 60 volume %, the encased coil body 24 was received into the primary molded body 16-1, in this state, the secondary molded body 16-2 was molded in the core 16 using the same mixture in the separated secondary molding die 96, and simultaneously, the secondary molded body was integrated with the primary molded body 16-1 and the encased coil body 24, whereby the reactor 15 (in the size, the outer diameter of the core 16 was ϕ90 mm and the height was 40.5 mm) was obtained.

Incidentally, at this time, the molding of the core 16 was performed according to the following conditions. That is, the injection-molding of the core 16 was performed with an injection temperature of 310° C., a temperature of the molding die of 150° C., and an injection pressure of 147 MPa.

Occurrence of cracks was not observed in the core 16 of the reactor 15 which was obtained as described above.

The voltage resistance characteristics of the reactor 15 obtained as described above was measured as follows, Here, the reactor 15 was directly disposed on an aluminum base plate so that the reactor 15 was electrically connected to the aluminum base plate, one terminal of a measuring device was connected to one coil terminal 18 of the reactor 15 and the other terminal thereof was connected to the aluminum base plate respectively, and in that state, energisation was performed so that the voltage was gradually increased from alternating current 0 V to 3500 V (volts), and the voltage was held for one second at 3500 V.

At that time, the reactor was acceptable if the flowing current was 10 mA (milliamperes) or less, the reactor was not acceptable if the flowing current was more than 10 mA, and in this way, the voltage resistance characteristics were determined.

As a result, according to the reactors of the present embodiment, all ten reactors used in the tests were acceptable.

On the other hand, in a comparative example in which the injection-molding was performed to the coil 10 in a state where the resin covering layer 22 was not formed with respect to the coil 10 and the core 16 was thus molded, insulation breakdown occurred in all ten reactors used in the test at 200 to 300 V (volts), and all were determined as being not acceptable, Incidentally, TOS 5051A manufactured by Kikusui Electronics Corporation was used for the measuring device.

As described above, an embodiment of the present invention is described. However, the embodiment is only an example.

For example, in the above-described embodiment, when the encased coil body 24 is molded, the outer circumferential covering portion 46 is firstly molded, and subsequently, the inner circumferential covering portion 50 is molded. However, according to circumstances, the coil 10 may be held and constrained to the outer circumferential surface through the primary molding die in the primary molding and the inner circumferential covering portion 50 may be molded, and thereafter, the outer circumferential covering portion 46 may be molded; or the primary molded body 22-1 and the secondary molded body 22-2 in the resin covering layer 22 may be molded in various shapes other than the above-described embodiment.

Moreover, the present invention may be applied to a case where the core 16 is molded by a potting method, that is, a case where the soft magnetic powder is mixed into the liquid of the thermosetting resin in a dispersion state, and the mixture is injected into the container and heat-hardened to mold the core. In addition, the present invention may also be applied to a case where the core is molded of other materials or by other molding methods.

In addition, the present invention may also be applied to a case where the coil is a coil which is configured by winding a wire in a state where an insulating layer such as a film of an insulating resin is interposed between wires, in addition to the case where the coil is the coil with attached insulating coating.

Moreover, in addition to the reactor, the present invention may be applied to a heating body of an electromagnetic cooker, or the encased coil body in another coil composite molded body. In this way, the present invention may be embodied and configured to aspects and forms to which various changes are added within a scope which does not depart from the gist of the present invention.

DESCRIPTION OF NUMERAL REFERENCES

10: coil
12: insulating coating
14: soft magnetic powder
22: resin covering layer
24: encased coil body
46: outer circumferential covering portion
50: inner circumferential covering portion
54: primary molding die
66 and 80: cavity
70: secondary molding die

The invention claimed is:

1. A method of manufacture for an encased coil body which is to be provided in a state of being embedded in an inner portion of a core containing a soft magnetic powder, in which the encased coil body includes an electric coil which is configured by winding a wire in a state where an insulating layer is interposed between layers of the wound wire, and an electrically insulating thermoplastic resin material which encases the electric coil in a state of entirely enclosing the electric coil from the outside, the method comprising:

injection-molding a resin covering layer which encases the coil with the resin material, wherein the injection-molding is conducted such that said injection-molding is divided into a primary molding and a secondary molding, wherein the primary molding includes contacting a primary molding die for the resin covering layer with an inner circumferential surface or an outer circumferential surface of the coil, and injecting the resin material into a primary molding cavity of the primary molding die which is formed on the outer circumferential side or the inner circumferential side of the coil in a state where the coil is constrained by the primary molding die so as to be positioned in a radial direction in the inner circumferential surface or the outer circumferential surface, thereby molding a primary molded body which includes an outer circumferential covering portion or an inner circumferential covering portion in the resin covering layer and also integrating the primary molded body and the coil, wherein the secondary molding includes, after the primary molding, setting the primary molded body along with the coil to a secondary molding die for the resin covering layer, and injecting the resin material into a secondary molding cavity of the secondary molding die which is formed on the inner circumferential side or the outer circumferential side of the coil, thereby molding a secondary molded body which includes the inner circumferential covering portion or the outer circumferential covering portion in the resin covering layer and also integrating the secondary molded body, the coil, and the primary molded body; and after the secondary molding, integrating the encased coil body with the core.

2. The method of manufacture for an encased coil body according to claim 1, wherein the resin covering layer comprises the electrically insulating thermoplastic resin material which does not contain the soft magnetic powder.

3. The method of manufacture for an encased coil body according to claim 1, wherein one molded body of the primary molded body and the secondary molded body, which includes the outer circumferential covering portion, includes an end surface covering portion which covers one axial end surface of the coil, and the other molded body of the primary molded body and the secondary molded body, which includes the inner circumferential covering portion, includes another end surface covering portion which covers the other axial end surface of the coil.

4. The method of manufacture for an encased coil body according to claim 2, wherein one molded body of the primary molded body and the secondary molded body, which includes the outer circumferential covering portion, includes an end surface covering portion which covers one axial end surface of the coil, and the other molded body of the primary molded body and the secondary molded body, which includes the inner circumferential covering portion, includes another end surface covering portion which covers the other axial end surface of the coil.

5. The method of manufacture for an encased coil body according to claim 1, wherein the electrically insulating thermoplastic resin material constitutes an entirety of the resin covering layer.

6. The method of manufacture for an encased coil body according to claim 1, wherein a thickness of the resin covering layer is in a range of 0.5 mm to 2.0 mm.

7. The method of manufacture for an encased coil body according to claim 1, wherein the coil includes a coil terminal formed so as to protrude from the encased coil body in the radial direction.

8. The method of manufacture for an encased coil body according to claim 1, wherein the primary molded body includes a thick portion which protrudes outward in the radial direction and is formed over an entire height in the primary molded body.

9. The method of manufacture for an encased coil body according to claim 1, wherein the core is configured of a molded body which is obtained by injection-molding a mixture comprising a soft magnetic powder and the resin material.

10. The method of manufacture for an encased coil body according to claim 1, wherein the secondary molded body is integrated with the primary molded body by a boundary surface.

* * * * *